United States Patent [19]
Knepler

[11] Patent Number: 6,124,574
[45] Date of Patent: Sep. 26, 2000

[54] HEATED BEVERAGE CONTAINER

[75] Inventor: John T. Knepler, Springfield, Ill.

[73] Assignee: Bunn-O-Matic Corporation, Springfield, Ill.

[21] Appl. No.: 09/452,262

[22] Filed: Dec. 1, 1999

[51] Int. Cl.$^7$ .............. H05B 3/68; H05B 1/02; F22B 1/30
[52] U.S. Cl. ............. 219/447.1; 219/518; 392/334
[58] Field of Search .............. 219/443.1, 445.1, 219/446.1, 447.1, 497, 518; 392/324, 325, 327, 329, 331, 333, 334, 336, 337, 338, 386, 394, 403, 404, 405, 406

[56] References Cited

U.S. PATENT DOCUMENTS

| | | | |
|---|---|---|---|
| 2,301,646 | 11/1942 | Stapleton | 392/333 |
| 3,134,007 | 5/1964 | Niblo | 219/447.1 |
| 3,585,362 | 6/1971 | Hoogesteger et al. | 392/324 |
| 3,586,824 | 6/1971 | Barney | 219/447.1 |
| 3,780,260 | 12/1973 | Elsner | 392/392 |
| 4,163,895 | 8/1979 | Hauser et al. | 392/333 |
| 4,421,993 | 12/1983 | Bloomer | 219/499 |
| 5,809,210 | 9/1998 | Moore et al. | 392/402 |

*Primary Examiner*—Sang Palk
*Attorney, Agent, or Firm*—Trexler, Bushnell, Giangiorgi & Blackstone, Ltd.

[57] ABSTRACT

An assembly is provided for heating a liquid, such as coffee. The assembly includes a container in which the liquid is retained, first and second electrodes associated with the container, an energy source with which the container can be engaged such that the first electrode comes into contact with the energy source, and a control circuit for supplying voltage from the energy source to the first electrode so that current will pass from the first electrode through the liquid and to the second electrode. Liquid in the container contacts the first and second electrodes and provides an electrical path from the first electrode to the second electrode.

10 Claims, 4 Drawing Sheets

HEATED BEVERAGE CONTAINER

BACKGROUND OF THE INVENTION

This invention is generally directed to a novel assembly for maintaining a desired temperature of a liquid, such as coffee or tea, in a container.

Prior art beverage warmers generally provide an electrical heating pad which is hot to the touch. This can result in a variety of problems, such as overheating the beverage, underheating the beverage, and being an exposed heating source.

The present invention eliminates the prior art warmer plate and provides a novel assembly for maintaining a desired temperature of the beverage. Other features and advantages will become apparent upon a reading of the attached specification, in combination with a study of the drawings.

OBJECTS AND SUMMARY OF THE INVENTION

A general object of the present invention is to provide a novel assembly for maintaining a desired temperature of a liquid, such as coffee or tea, in a container.

An object of the present invention is to provide an assembly for maintaining a desired temperature of a liquid, such as coffee or tea, in a container which eliminates an external warmer plate.

A further object of the present invention is to provide an assembly which saves energy, prevents exposure of a heat source, and can maintain heated beverage quality longer.

Briefly, and in accordance with the foregoing, the present invention discloses an assembly for heating a liquid, such as a brewed beverage, for example coffee or tea, or maintaining the desired temperature of the liquid. The assembly includes a container in which the liquid is retained, first and second electrodes associated with the container, an energy source with which the container can be engaged such that the first electrode contacts the energy source, and a control circuit for controllably supplying voltage from the energy source to the first electrode so that current will pass from the first electrode through the beverage and to the second electrode. Liquid in the container contacts the first and second electrodes and provides an electrical path from the first electrode to the second electrode.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
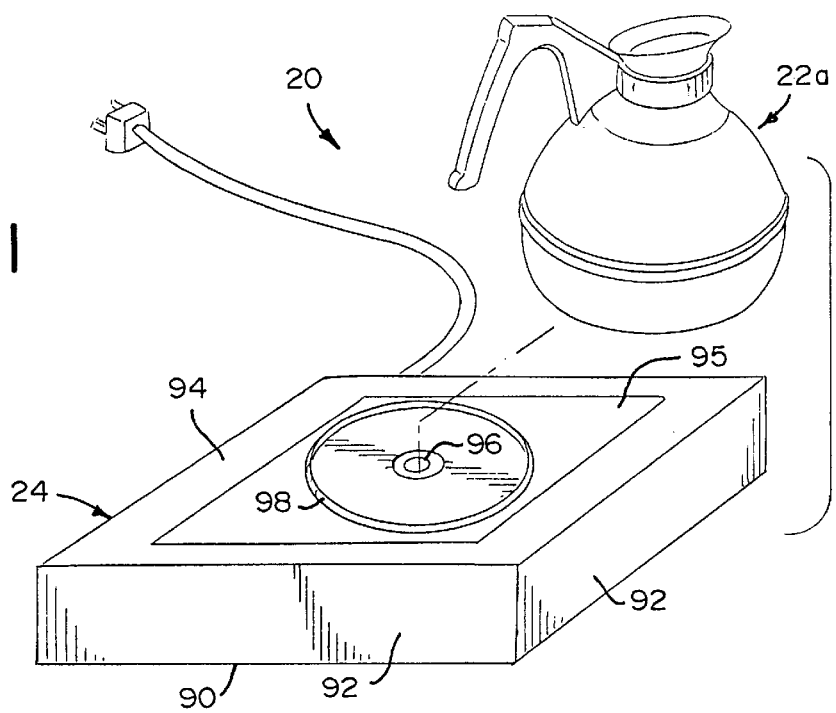
FIG. 1 is a perspective view of a container which can be engaged with an energy source which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

An assembly 20 is provided which includes a container 22a, 22b which is placed upon an energy source 24. The energy source 24 provides a voltage to the container 22a, 22b by a control circuit 26 so that current is passed through a liquid, such as beverage, for example brewed coffee or tea, which is contained in a reservoir 28a, 28b within the container 22a, 22b so that the liquid is heated or remains heated at a desired temperature. A first embodiment of the container 22a is shown in FIGS. 1–3 and a second embodiment of the container 22b is shown in FIG. 4.

Figure 2:
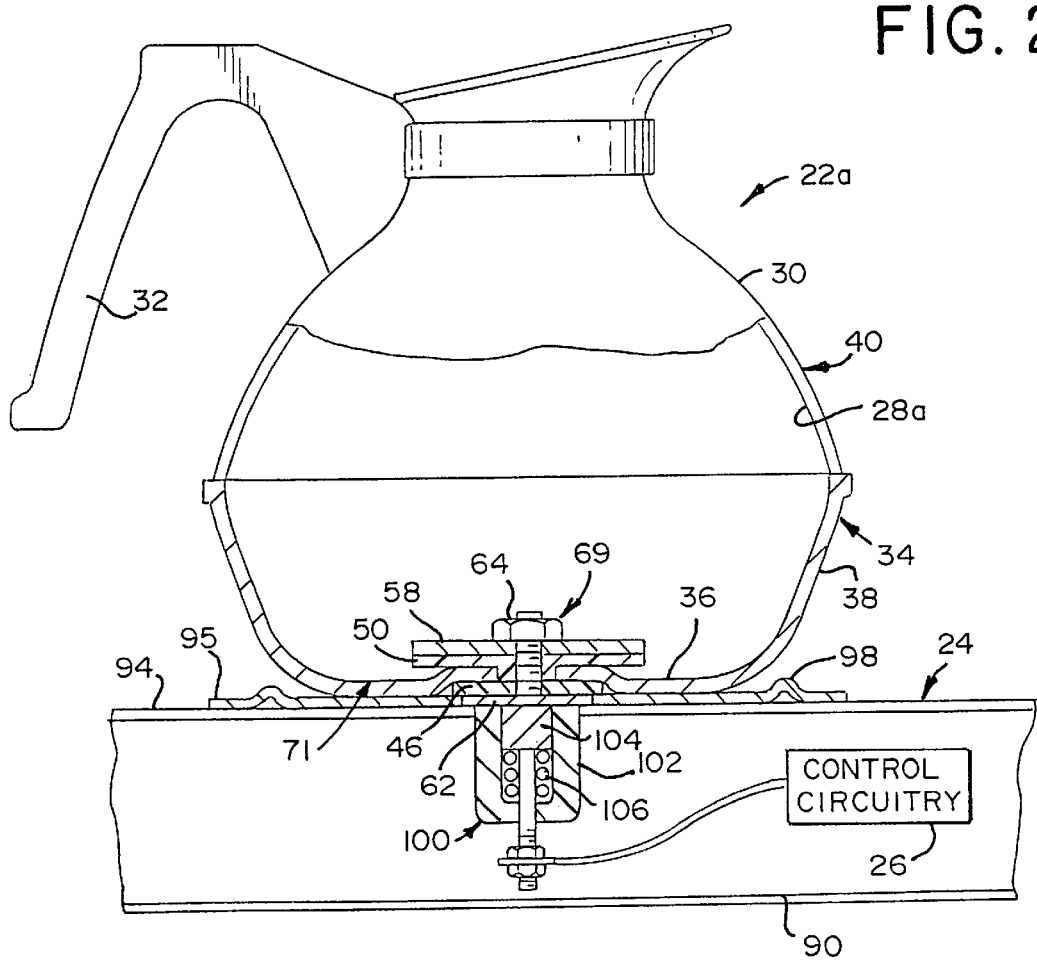
FIG. 2 is a partial cross-sectional view of the container and a cross-sectional view of the energy source of FIG. 1 in an engaged position.
Figure 3:
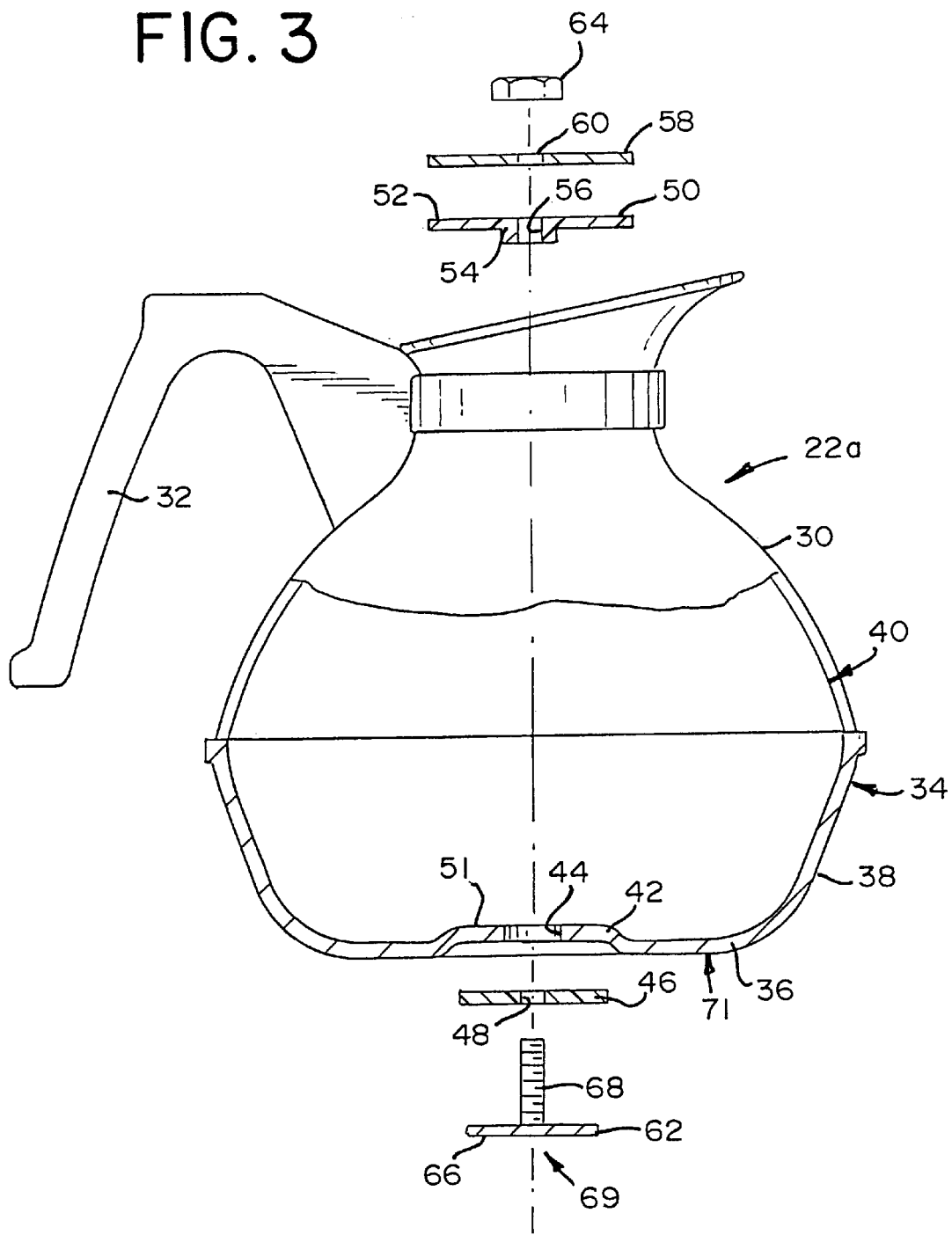
FIG. 3 is an exploded view of the container of FIG. 1.
Figure 4:
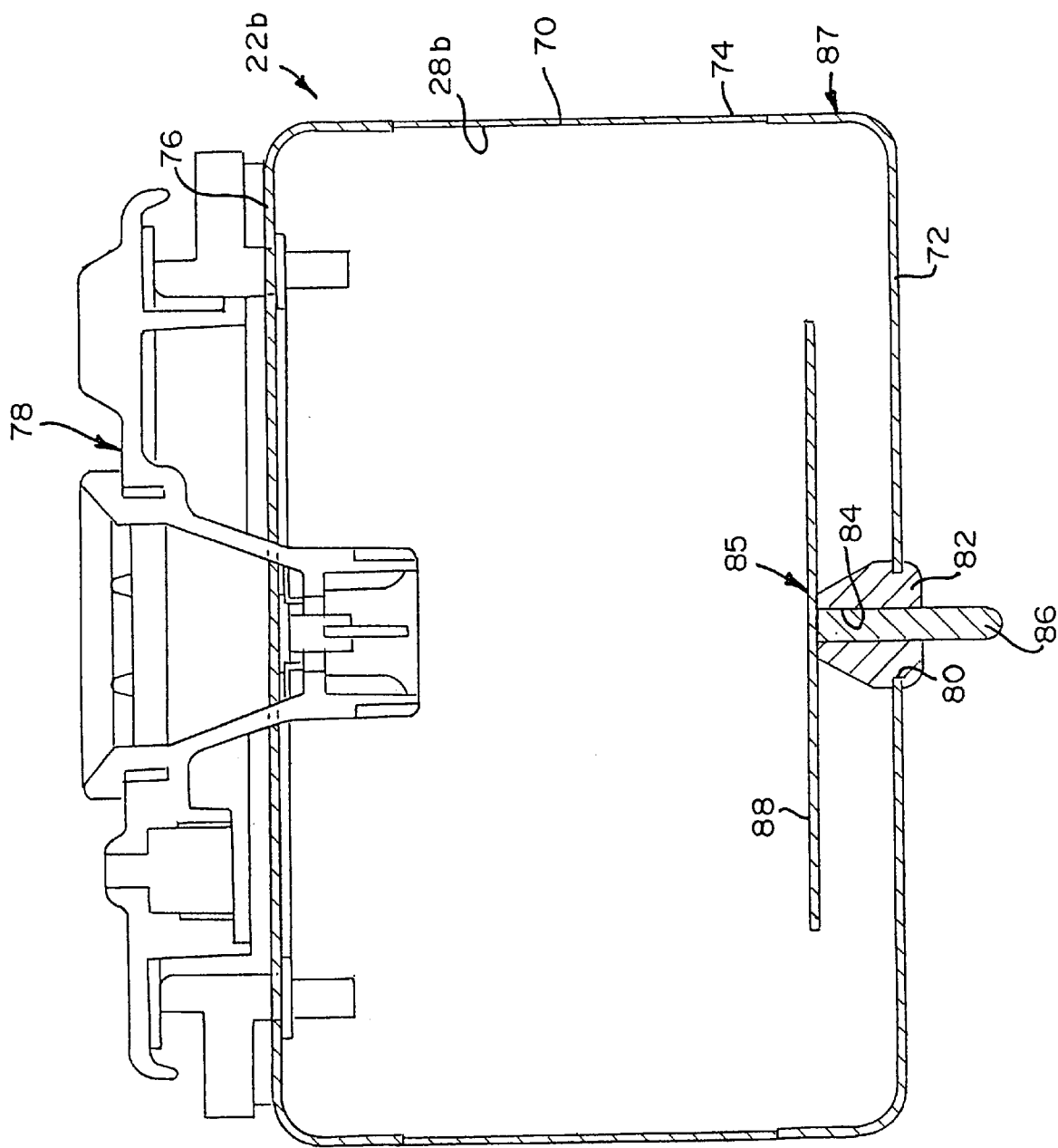
FIG. 4 is a cross-sectional view of an alternate container which incorporates the features of the invention and that can be engaged with the energy source shown in FIG. 2.

The container 22a shown in FIGS. 1–3 is a carafe and includes a body 30 which has a plastic handle 32 attached thereto so that a user can grip the container 22a. A lower portion 34 of the body 30 includes a bottom wall 36 and a side wall 38 which extends upwardly therefrom. The lower portion 34 is made of a conductive material, such as stainless steel. An upper portion 40 of the body 30 completes the side wall of the container 22a and is made of a suitable material, such as glass or plastic.

The bottom wall 36 of the lower portion 34 is generally flat with the exception of an indentation 42 formed therein. An aperture 44 is provided through the center of the indentation 42.

A lower non-conductive washer member 46 sits against the underside of the indentation 42. The lower washer member 46 is flat and has an aperture 48 therethrough. The non-conductive washer member 46 may be made of silicone or Teflon® or any other suitable non-conductive material having suitable heat resistant characteristics, which is suitable for exposure to food products, and which is washable. The washer member 46 must also provide a degree of sealing of the aperture 44 to prevent leaking of beverage therethrough.

An upper non-conductive washer member 50 sits against the upper side 51 of the indentation 42. The upper washer member 50 has a flat portion 52 with a cylindrical skirt 54 which depends downwardly therefrom. A passageway 56 is provided through the flat portion 52 and through the skirt 54. The non-conductive washer member 50 may be made of silicone or Teflon®.

A conductive washer member 58 sits against the upper surface of the upper washer member 50. The washer member 58 is flat and has an aperture 60 through the center thereof. The washer member 58 may be made of stainless steel.

When assembled, the skirt 54 of the upper washer member 50 extends through the aperture 44 in the indentation 42. The skirt 54 seals with the indentation 42 and with the lower washer member 46 to form a fluid-tight seal between the upper washer member 50, the indentation 42 and the lower washer member 46. The conductive washer member 58 sits on top of the upper non-conductive washer member 50 such that the aperture 60 and the passageway 56 are aligned.

In its simplest form, a conductive stud 62 and nut or fastener 64 are used to secure the conductive washer member 58, the upper non-conductive washer member 50, the lower non-conductive washer member 46 together with the body 30. The stud 62 includes a flat head 66 which has a threaded shank 68 extending therefrom. The flat head 66 engages against the bottom surface of the lower non-conductive washer member 46 and the threaded shank 68 extends through the apertures 48 and 44, through the passageway 56, and through the aperture 60 until the shank 68 extends beyond the upper surface of the conductive washer member 58. The nut 64 is threaded onto the end of the shank 68 which extends beyond the upper surface of the conductive washer member 58 and is tightened until the nut 64 engages firmly against the conductive washer member 58. As the threaded shank 68 is engaged through the lower and upper washer members 46, 50, the threads may cold work the washer members 46, 50 so that a thread is formed therein such that a fluid-tight seal is obtained between the stud 62 and the washer members 46, 50.

It should be appreciated that the foregoing is only one embodiment of fastening the conductive structure 58, 62 and insulating structures 46, 50 to the container 22a. A permanent fastening structure, such as by way of riveting or welding or any other suitable fastener may be used. In fact, such a permanent fastening structure may be required depending upon the criteria of the relevant sanitation certification organization.

As a result of this construction, the conductive stud 62 and nut 64 and the conductive washer member 58 are insulated from contact with the conductive lower portion 34 of the container 22a by the non-conductive lower and upper washer members 46, 50. The conductive stud 62, washer member 58 and nut 64 define a first electrode, collectively identified as 69. The conductive lower portion 34 of the body 30 defines a second electrode, identified as 71. The first electrode 69 and the second electrode 71 are only in electrical contact with each other or otherwise electrically coupled as a result of the beverage within the reservoir 28a which comes into contact with the first electrode 69 and the second electrode 71.

The container 22b shown in FIG. 4 is a tank formed from a conductive body 70. The body 70 includes a generally flat bottom wall 72, a generally cylindrical side wall 74 which extends upwardly therefrom and a top wall 76 at the upper end of the side wall 74. A brew-through lid 78, such as the one disclosed in U.S. Pat. Nos. 4,739,898 or 5,480,054 is provided and mates with an aperture through the top wall 76. The bottom wall 72 has an aperture 80 through the center thereof. The body 70 may be formed of stainless steel.

A non-conductive grommet member 82 fills the aperture 80 in the bottom wall 72 and seals therewith. The grommet member 82 has a passageway 84 therethrough. The grommet member 82 may be made of silicone.

A conductive shank 86 is mounted within the aperture 84 through the grommet member 82 and is sealed therewith. The shank 86 may be made of stainless steel. The end of the shank 86 extends beyond the bottom wall 72 of the body 70.

A generally flat, conductive plate 88 is connected to the end of the shank 86 within the reservoir 28b. The plate 88 may be made of stainless steel. The plate 88 and the shank 86 may be integrally formed, or may be welded together to form a one-piece construction.

As a result of this construction, the conductive shank 86 and the conductive plate 88 are insulated from contact with the conductive body 70 by the non-conductive grommet member 82. The conductive shank 86 and plate 88 define a first electrode, collectively identified as 85. The conductive body 70 defines a second electrode, identified as 87. The first electrode 85 and the second electrode 87 are only in electrical contact with each other or otherwise electrically coupled as a result of the beverage within the reservoir 28b which comes into contact with the first electrode 85 and the second electrode 87.

The energy source 24 includes a housing which has a bottom wall 90, four side walls 92 and a top wall 94. A non-conductive pad 95 is provided on the top wall 94 and an aperture 96 is provided therethrough. The pad 95 is flat except for a positioning structure 98 provided thereon. The positioning structure 98, as shown in FIGS. 1 and 2, is a circular ring which extends upwardly therefrom. It is to be understood that the positioning structure 98 can take other forms and other shapes. The positioning structure 98 causes the container 22a or 22b, when placed on the energy source 24, to be properly positioned thereon so that the head 66 of the stud 62 or the bottom end of the shank 86 comes into contact with a plunger assembly 100 provided in the energy source 24.

The plunger assembly 100 includes a plunger holding member 102 which is mounted within the aperture 96. A side wall of the plunger holding member 102 depends downwardly from the top wall 94 and a bottom wall thereof is provided at the bottom of the side wall and has an aperture through the center thereof.

A plunger 104 and a spring 106 are mounted within the plunger holding member 102. The plunger 104 includes a shank with a head at end thereof. The shank extends through the aperture in the bottom wall of the plunger holding member 102. The spring 106 surrounds the shank and bears against the underside of the head and the bottom wall of the plunger holding member 102. The spring 106 normally acts to bias the head of the plunger 104 upwardly such that the head extends beyond the top wall 94 of the energy source 24. The control circuitry 26 is connected to the plunger 104 by suitable wiring.

When the container 22a, 22b is placed on the energy source 24, the head 66 of the stud 62 or the end of the shank 86 comes into contact with the head of the plunger 104. The plunger 104 is biased downwardly within the holding member 102, but because of the spring 106, will be forced against the stud 62 or against the shank 86. The head 66 of the stud 62 may have corrugations thereon to provide a better contact with the head of the plunger 104.

Figure 5:
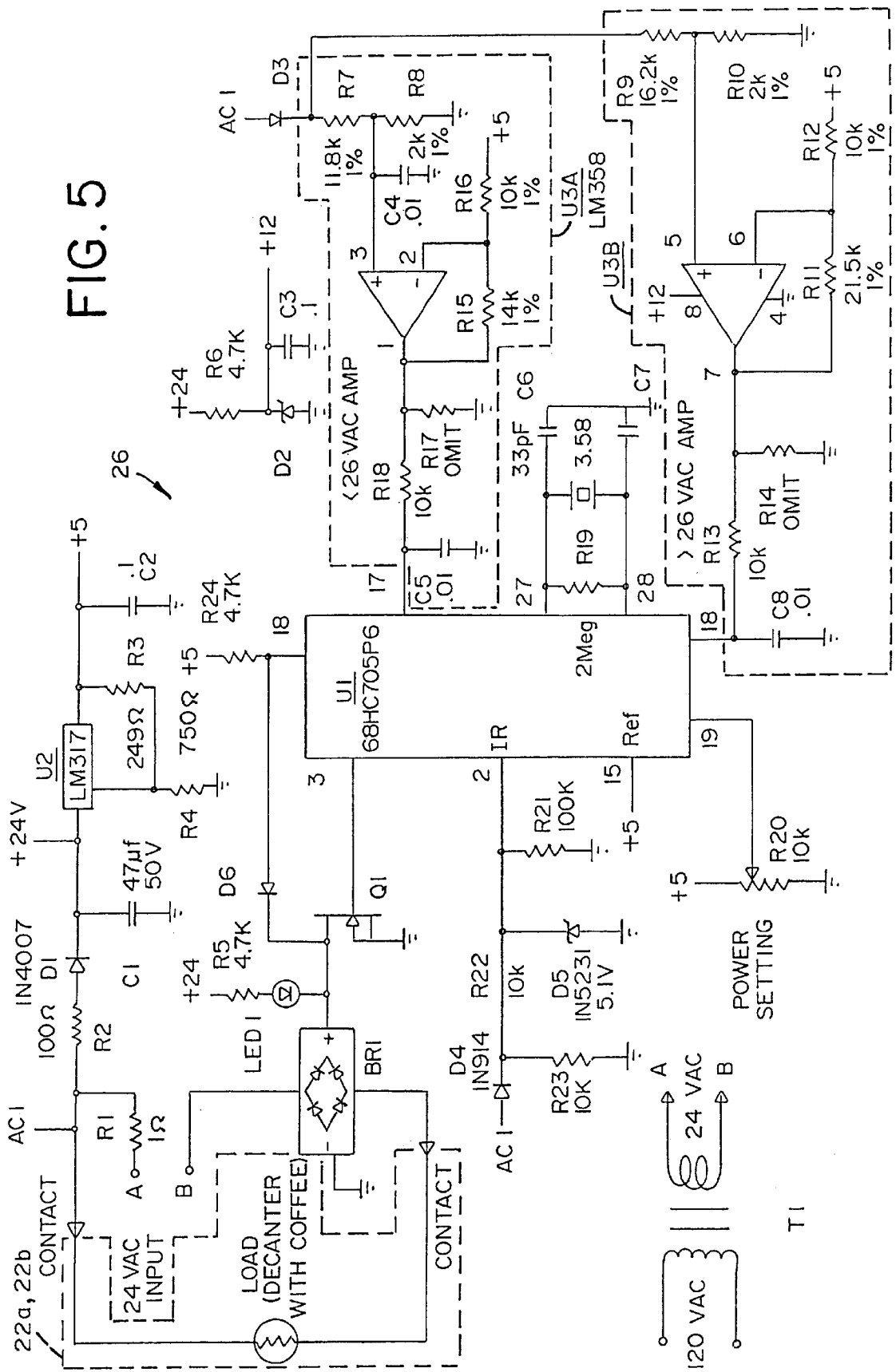
FIG. 5 is a control circuit which is used to control the voltage applied to the containers of FIGS. 1–3 or 4.

The control circuitry 26 is a constant power control circuit for use with the present invention, see FIG. 5. The control circuitry 26 compares a selected power setting with the actual power consumption and varies the duty cycle of the voltage applied to the container 22a, 22b as required. The setting is made by adjusting resistor R20 to an experimentally determined value that maintains temperature within required limits. The variable terminal of resistor R20 is connected to one of the analog inputs of the microprocessor U1.

The voltage applied to the load, the container 22a, 22b with the beverage therein, is nominally 24 VAC. This voltage, however, is subject to variation from supply voltage and transformer manufacturing tolerances. The transformer T1 reduces the voltage applied to the load 22a, 22b from 120 VAC to 24 VAC. Therefore, the actual voltage is monitored and the result used to determine the duty cycle. The voltage is rectified by diode D3, amplified by U3A and U3B and applied to two analog inputs of microprocessor U1. Two inputs are used to improve the measurement resolution by dividing the range of expected inputs into two parts; a single input may be sufficient for less accurate control requirements.

The current through the load 22a, 22b is dependent on the size and position of the first electrodes 69, 85 within the container 22a, 22b as well as the conductivity of the beverage. The current through the load 22a, 22b is determined by measuring the voltage drop across resistor R1. Because microprocessor U1 controls the application of current to the load 22a, 22b, the microprocessor U1 takes a first voltage measurement, V0, with transistor Q1 off. Then, microprocessor U1 turns transistor Q1 on and takes a second voltage measurement with the current flowing, V1. The current is then calculated as I=(V0−V1)/R1. The power delivered to the load 22a, 22b while the current is flowing is calculated from P=V1*I.

The power, P, is compared with the setting of resistor R20 and then the on time of transistor Q1 is varied to achieve the desired setting. For example, if P=100 watts and resistor R20 is set to 60 watts, then transistor Q1 would be turned on for 60% of the time to yield a long term average load power of 60 watts. Typically, the on/off cycling is done over a period of 100 alternating current line cycles. In this example, the power would be applied for 60 cycles and then turned off for 40 cycles and then the sequence repeated continuously.

The alternating current voltage input via diode D4, etc. to pin 2 of microprocessor U1 provides a synchronization signal to allow turning the power on and off at points where the supply voltage crosses zero. This minimizes current surges and generation of electrical noise. The path from the drain of transistor Q1 through diode D6 to pin 18 of microprocessor U1 provides protection against damage in case the load 22a, 22b is shorted. With a normal load, the voltage at the drain of transistor Q1 pulls to ground when transistor Q1 turns on. If the load is shorted, the drain voltage and pin 18 remain high and microprocessor U1 immediately ceases trying to turn transistor Q1 on, thereby preventing damage. Microprocessor U1 then tests periodically for the presence of the short and returns to normal operation when the load returns to a safe value.

Because current passes directly through the beverage, the current needs to be alternating so that a plating effect does not occur. Diode bridge BR1 rectifies this alternating current so that the load switching can be done by an inherently direct current device, transistor Q1. One of ordinary skill in the art can redesign the circuit using the disclosure provided herein to provide a fully equivalent circuit which uses an alternating current switching device, such as a triac.

An alternative to using resistor R1 for current sensing is to use the inherent internal resistance of the secondary winding of transformer T1. In fact, for maximum accuracy, the above calculations using resistor R1 must include this internal resistance in resistor R1.

Components include U2 and diode D2 which regulate the supply voltage to microprocessor U1 and U3 respectively. Light emitting diode LED1 provides a visual indication of the power cycling.

With the assembly 20 of the present invention, the coffee or brewed tea does not burn and caramelize on the bottom of the container 22a, 22b which tends to happen when a prior art warmer plate is used and small amounts of coffee or tea were left on the warmer. In the present invention, the movement of the electrons through the liquid heats the liquid. Consequently, the heat distribution is relatively uniform as compared to conventional methods. Prior art warmer plates depend on conduction from the hot surface through the base of the container and into the liquid; the liquid in the direct contact with the base is, at least temporarily, much hotter than the liquid higher in the container. The uniformity of the heating when the present invention is used depends on the shape and the positioning of the electrodes since the current will take the path of least resistance.

The assembly 20 of the present invention eliminates the external warmer plate as is used in the prior art. Underwriter's Laboratories certification guidelines allows up to 30V to be employed when the device is exposed to touch. The assembly 20 of the present invention uses 24V exposed to touch at the head of the plunger 104. In addition, the assembly 20 of the present invention saves energy, improves safety, and can retain beverage quality longer. When the beverage is coffee, coffee is a good conductor because of oils and particles therein.

While preferred embodiments of the present invention are shown and described, it is envisioned that those skilled in the art may devise various modifications of the present invention without departing from the spirit and scope of the appended claims.

The invention claimed is:

1. An assembly for heating a liquid or maintaining the temperature of a liquid comprising:
    a container for holding the liquid, said container including a conductive portion formed of a conductive material and having a non-conductive portion;
    a conductive contact member provided within said non-conductive portion, said conductive contact member defining a first electrode;
    said conductive portion of said container defining a second electrode, wherein liquid in said container contacting said first and second electrodes providing an electrical path from said first electrode through the liquid to said second electrode;
    an energy source with which said container is capable of being engaged such that said first electrode comes into contact with said energy source; and
    a control circuit for controllably supplying voltage from said energy source to said first electrode so that current will pass from said first electrode through said liquid and to said second electrode.

2. An assembly as defined in claim 1, wherein said conductive material is stainless steel.

3. An assembly as defined in claim 1, wherein said conductive contact member extends through said non-conductive portion.

4. An assembly as defined in claim 3, wherein said conductive contact member is formed from stainless steel.

5. An assembly as defined in claim 3, wherein said non-conductive portion is provided by a non-conductive member which is provided through a portion of said container which is conductive.

6. An assembly as defined in claim 5, wherein said non-conductive member is formed from silicone.

7. An assembly as defined in claim 1, wherein said energy source includes a spring-biased plunger which is capable of being engaged with said first electrode when said container is engaged with said energy source.

8. An assembly as defined in claim 1, wherein said energy source includes positioning means for properly positioning said container with said energy source.

9. An assembly comprising:
    a liquid;
    a container for holding said liquid;
    a first electrode associated with said container;
    a second electrode associated with said container, said liquid contacting said first and second electrodes providing an electrical path from said first electrode through said liquid to said second electrode;

an energy source with which said container is capable of being engaged such that said first electrode comes into contact with said energy source; and a control circuit for controllably supplying voltage from said energy source to said first electrode so that current will pass from said first electrode through said liquid and to said second electrode, said control circuit comparing a selected power setting with actual power consumption and accordingly varying the duty cycle of the voltage applied to said first electrode.

10. An assembly as defined in claim 1, wherein said voltage which is applied to said first electrode is nominally 24 VAC.

* * * * *